(No Model.) H. C. HUNT. 4 Sheets—Sheet 2.
ROTARY ENGINE.
No. 501,146. Patented July 11, 1893.

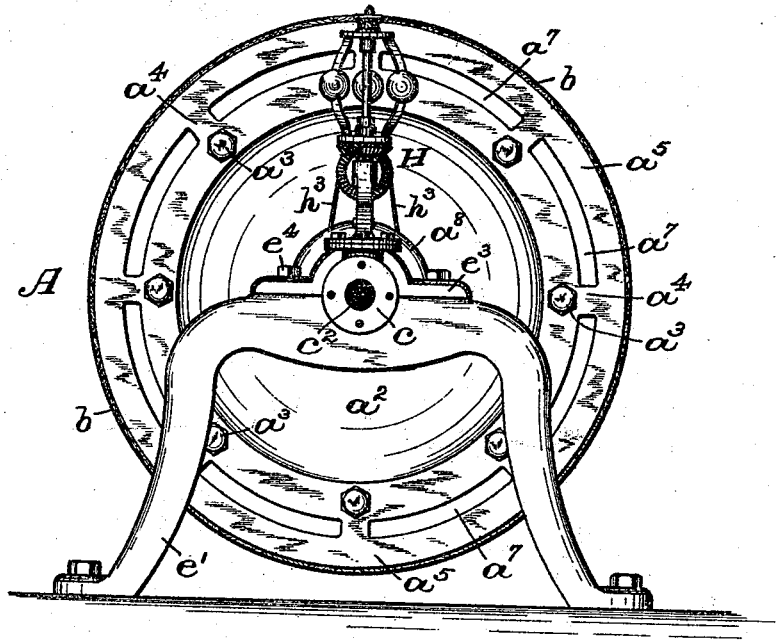
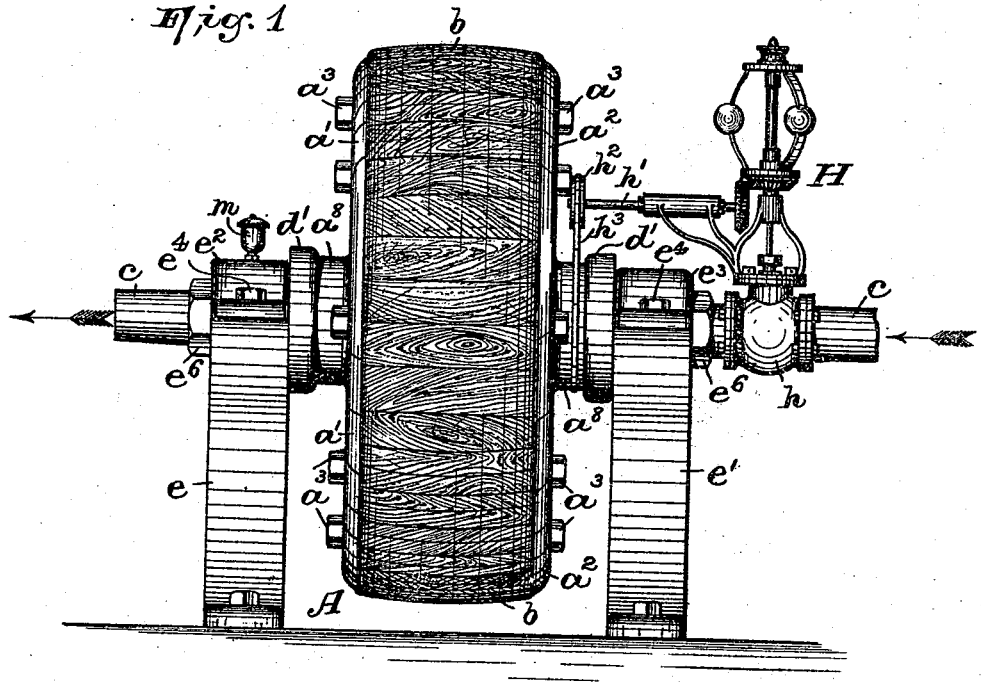

WITNESSES: INVENTOR:
Henry C. Hunt,
BY Fred H. Graentzel, ATT'Y.

(No Model.)  4 Sheets—Sheet 3.

H. C. HUNT.
ROTARY ENGINE.

No. 501,146.  Patented July 11, 1893.

WITNESSES:
Wm. H. Canfield, Jr.
B. Mortimer Trusdell.

INVENTOR:
Henry C. Hunt,
BY Fred'k C. Fraentzel, ATT'Y.

(No Model.) 4 Sheets—Sheet 4.
H. C. HUNT.
ROTARY ENGINE.

No. 501,146. Patented July 11, 1893.

WITNESSES: INVENTOR:
Henry C. Hunt,
BY Fred'k C. Fraentzel, ATT'Y.

UNITED STATES PATENT OFFICE.

HENRY C. HUNT, OF NEWARK, NEW JERSEY.

ROTARY ENGINE.

SPECIFICATION forming part of Letters Patent No. 501,146, dated July 11, 1893.

Application filed February 15, 1892. Serial No. 421,531. (No model.)

*To all whom it may concern:*

Be it known that I, HENRY C. HUNT, a citizen of the United States, residing at Newark, in the county of Essex and State of New Jersey, have invented certain new and useful Improvements in Rotary Engines; and I do hereby declare the following to be a full, clear, and exact description of the invention, such as will enable others skilled in the art to which it appertains to make and use the same, reference being had to the accompanying drawings, and to letters and figures of reference marked thereon, which form a part of this specification.

This invention relates to improvements in rotary engines.

The chief peculiarities of my novel form of rotary engine, are that while the cylinder, which rotates, is balanced in all its parts, thereby constituting by its own weight and surface the fly-wheel and also the belt-pulley, the shaft with its piston and all its unbalanced parts, are stationary and non-revoluble, thereby securing perfect steadiness of movement; and the position and arrangement of the inductive port in the piston and the positions of the valves are such that steam is continuously admitted to cause it to exert its full power upon the nearest valve to the induction port during all points of the revolution, whereby the "dead centers" are avoided, causing the engine, as soon as the steam is admitted, to start, no matter what are the relations of the several parts of the engine to one another, which is a very valuable feature.

Another very important feature is the arrangement of the valves, of which there are preferably four, and their positions in relation to the admission port for the steam from the piston, being such that they will cut off steam at the most desirable point and work the steam or other motive power expansively.

The invention consists of certain peculiar arrangements and combinations of parts, such as will be hereinafter more fully described and finally embodied in the clauses of the claim.

In the accompanying sheets of drawings, is illustrated my novel form of rotary engine, in which—

Figure 3:
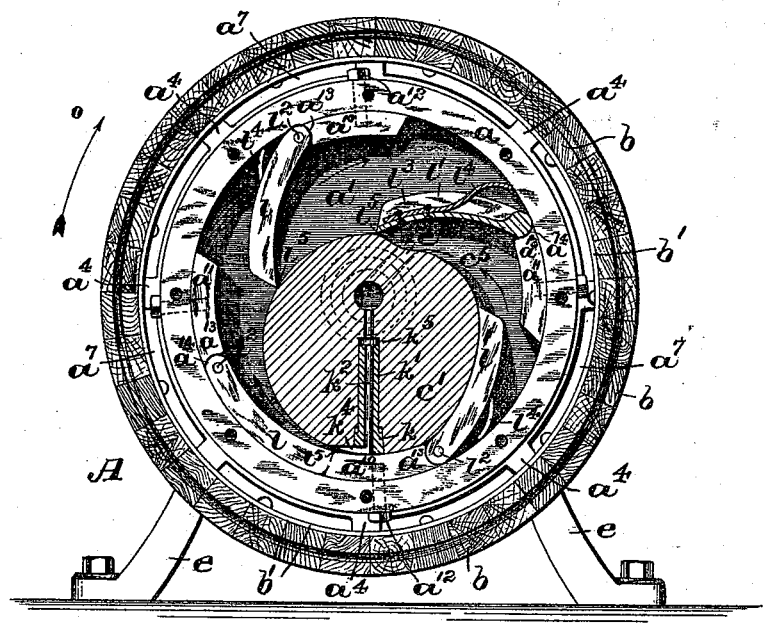
Figure 4:
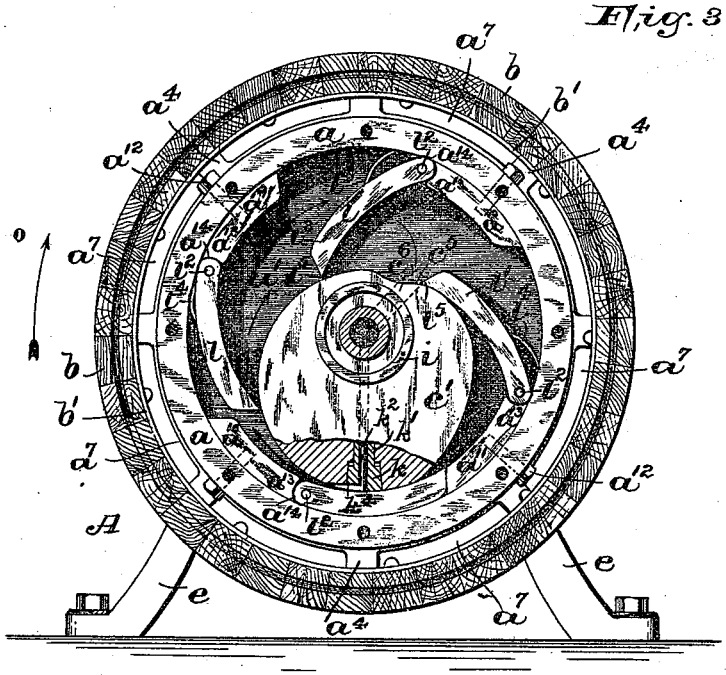
Figure 5:
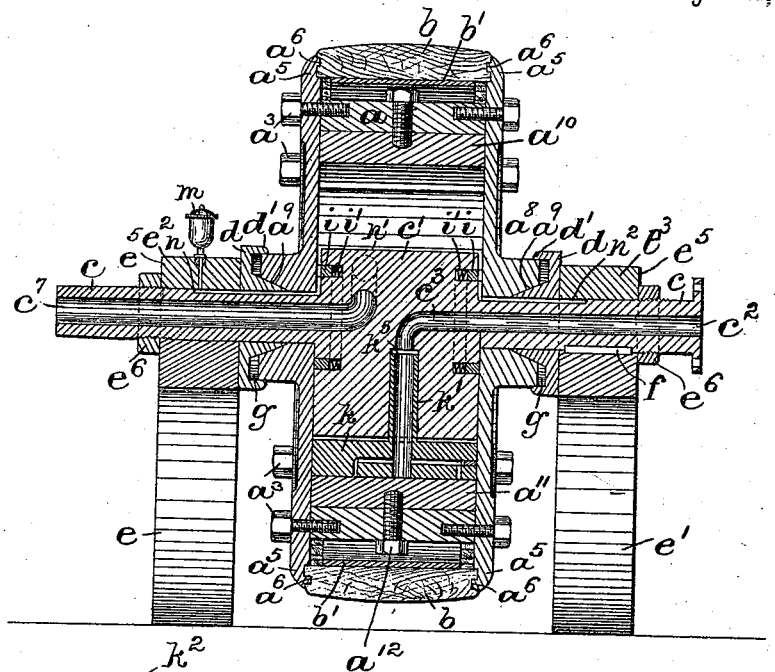
Figure 6:
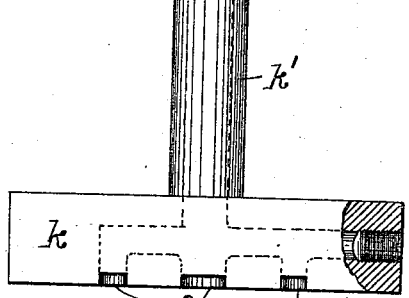
Figure 7:
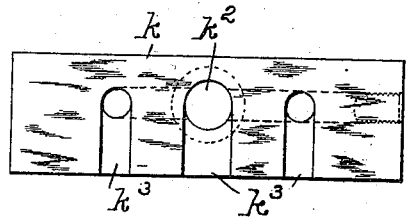
Figure 8:
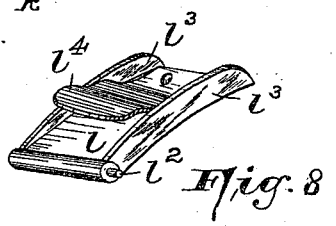
Figure 9:
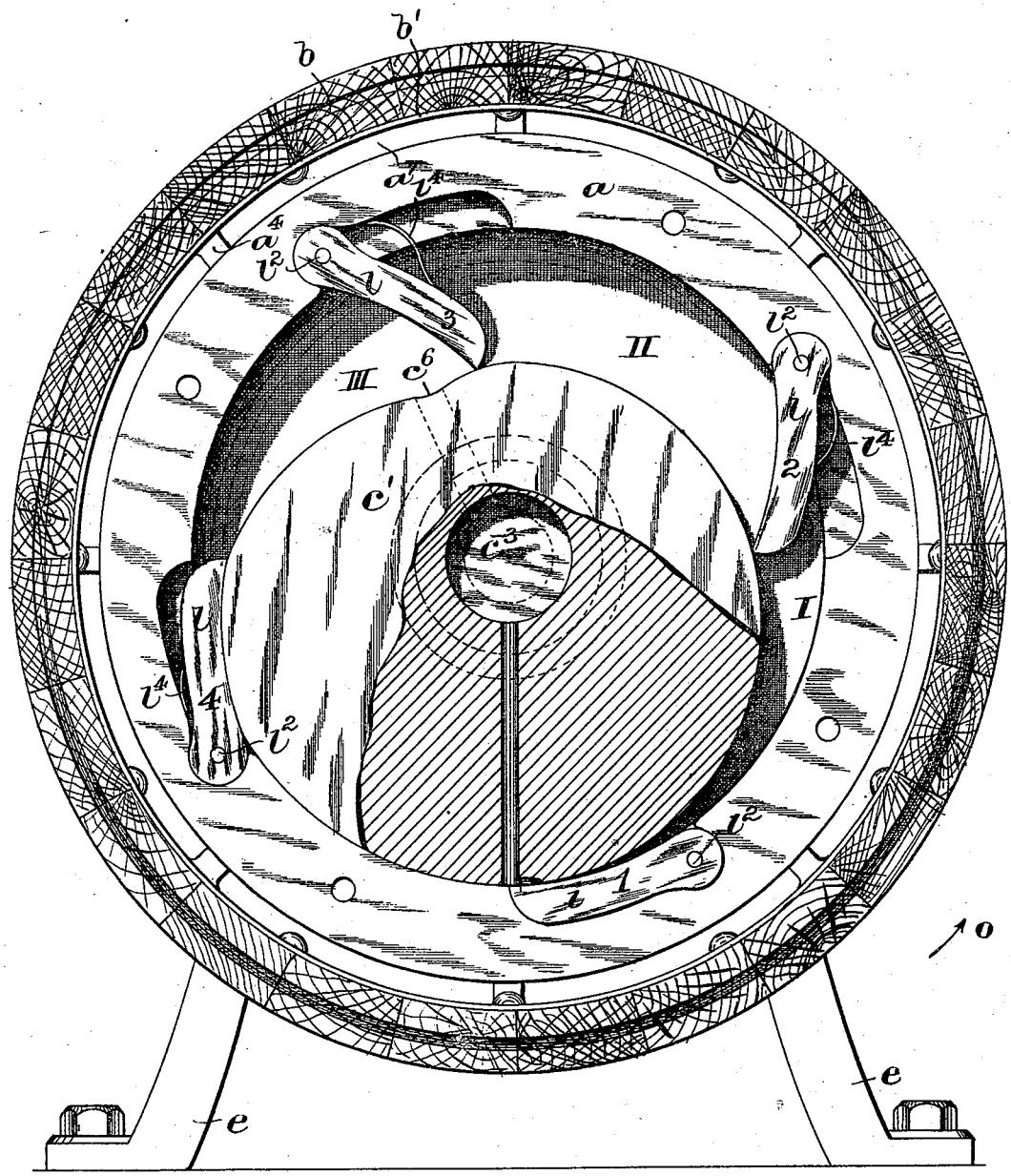

Figure 1 is an end elevation of the same, and Fig. 2 is a front or side view of the same, both views clearly illustrating the arrangement of a governor on the inlet portion of the shaft, or in any other suitable position, as may be desirable, for governing the supply of steam to the engine and regulating the speed. Fig. 3 is a vertical section of the engine, showing the relation of the several parts, when the full volume of steam enters for an instant back of one valve and is just about to be cut off by another valve to permit the previously admitted steam to act expansively on one of the other valves, and Fig. 4 is a similar view, the cylinder being represented as having rotated about an eighth of a revolution, the view clearly illustrating the positions of the valves, the valve which was closed in Fig. 3, now receiving the full volume of steam and being forced along the surface of the cam-shaped piston, while the steam which had been previously admitted in front of the valve on which it acted by expansion escapes through the exhaust pipes in the piston and passes out of the opposite or exhaust end of the shaft. Fig. 5 is a vertical section of the engine, to clearly illustrate the arrangement of the inlet or induction port and the exhaust port in the cam on the shaft and the ducts therein for the passage of the steam. Fig. 6 is a side view of a bridge arranged in the cam of the shaft, constituting a cushioned and adjustable inlet port, which adapts itself to the inner contour of the cylinder and the valves, in case of any wear due to friction and thereby prevents any undue noise which may be caused by the passage of the valves over the inlet ports. Fig. 7 is an end view of the same, both views showing one arrangement of the passages for admitting the steam into the cylinder. Fig. 8 is a perspective view of one of the valves detached. Fig. 9 is an enlarged vertical section of the rotary engine, provided with a slightly modified form of stationary piston, and the application of the four valves used in connection therewith.

Similar letters of reference are employed to indicate corresponding parts in each of the above described views.

In said views, A designates the cylinder, which, as will be seen more especially from Figs. 2 and 3, consists of an annular ring portion *a*, on which are arranged on opposite sides thereof, the cylinder heads or covers *a'* and $a^2$, being secured thereto by means of any number of bolts $a^3$. Each cover may be provided with suitable arms $a^4$ connecting with concentric ring portions $a^5$, and provided on their inner surfaces with annular grooves $a^6$. Between said portions $a^5$ and supported by these grooves $a^6$, I have arranged the lagging $b$, which consists preferably of small pieces of wood, secured to a ring $b'$ preferably of sheet metal. The lagging $b$ answers the purpose of the pulley portion over which can be arranged a belt, as will be evident. The arms $a^4$ and the ring portion $a^5$ form certain openings $a^7$ with the main portions of the cylinder covers, through which the heat from the cylinder escapes, thereby keeping the lagging comparatively cool and thus preventing any charring or burning of the belt. As will be seen from said Figs. 2 and 5, each cylinder cover is provided with a centrally arranged hub $a^8$, for supporting the cylinder on the shaft $c$. Said hubs may be provided with a cone-shaped opening $a^9$ in which is arranged a correspondingly cone-shaped collar $d$, provided with inwardly projecting flanges $d'$, which extend over the hubs on the cylinder covers, as shown. Against the outer portions or surfaces of said collars $d$ are placed the standards or supports $e$ and $e'$ of the engine, the shaft $c$ being arranged in bearings therein, preferably by means of a key $f$, as shown in Fig. 5, and upon said standards are secured suitable bearing plates $e^2$ and $e^3$, thereby holding the shaft securely in its bearings in the standards and preventing the turning of said shaft, said bearing plate being firmly held down by bolts $e^4$. On the shaft $c$ and against the surface of the standards are placed suitable nuts $e^6$ or other devices for taking up any wear of the several parts of the engine. Thus as the sides of the cam piston wear against the inner surfaces of the cylinder heads, the cone surfaces in the hubs and the collars $d$ correspondingly wear, and a space $g$, which may be filled with packing material, can be lessened by screwing up one or both of the nuts $e^6$, whereby the standards can be brought closer together. This also serves to make the parts perfectly steam tight and still allows the cylinder to revolve upon the stationary shaft $c$.

At any suitable position in the shaft $c$ is placed a valve $h$ provided with a governor H, having a shaft $h'$, provided with a pulley wheel $h^2$, and a belt $h^3$ passes over the hub on the cylinder head nearest to it for operating the governor. Instead of working the governor by means of the belt $h^3$, as shown, I may use a suitable gear-wheel, or the wheel $h^2$ can be made to work by friction against the revolving cylinder, as will be understood.

On the shaft $c$, within the cylinder A, is arranged a cam-shaped piston $c'$, which may be formed integral with the shaft, if desirable. In opposite sides of said piston, arranged in grooves therein, may be placed suitable packing rings $i$ behind which can be placed springs, as $i'$, for forcing the rings against the inner surfaces of the cylinder covers and thereby rendering the parts perfectly steam-tight. The inlet portion of the shaft $c$ is provided with the inlet duct $c^2$ for the steam which communicates with a duct $c^3$ in the cam and forms the inlet port. Said duct may be of an increased diameter, as shown, and in the same can be arranged the stem $k'$ of a bridge $k$, which is movable in a cut-away portion $c^4$ in the cam-shaped piston. Said stem is tubular as at $k^2$ and in the bridge $k$ terminates any suitable number of ports $k^3$, which also open to one side of the cam-shaped piston, as at $k^4$, see Figs. 3 and 4, the purpose of which will be described hereinafter. A space $k^5$ is formed back of the stem $k'$ behind which the steam enters and acts as a cushion to constantly force the bridge $k$ against the inner surfaces of the cylinder and valves, during the rotation of the same. At a suitable point $c^5$ in the piston $c'$ begins the exhaust duct or port $c^6$ which terminates in the steam outlet $c^7$ in the opposite end of the shaft.

As will be seen from Figs. 3 and 4, the inner surfaces of the cylinder ring may be provided with oppositely placed cut-off surfaces $a^{10}$ and $a^{11}$, which may be formed integral therewith or may be secured to the cylinder by bolts $a^{12}$. At the ends $a^{13}$ of said cut-off surfaces are formed the semicircular portions $a^{14}$, in which are arranged the valves $l$ and $l'$. Said valves may be provided with pivots $l^2$ for pivoting or hinging them in the cylinder covers, but these pins or pivots are not absolutely necessary. Each valve is provided with ribs $l^3$ and secured between said ribs is a spring $l^4$, which normally engages with the surface of the cylinder ring $a$ and constantly keeps the end $l^5$ of each valve against the cam surface of the piston, as will be seen from said Figs. 3, 4, and 9, and owing to the pressure of the steam against the valve causes said surfaces $l^5$ to work steam-tight against the piston.

In order to sufficiently lubricate the several parts of the engine, an oil-cup $m$ may be arranged in one of the bearing plates on the one standard, as shown in Fig. 5, and a duct leading therefrom into a duct $n$ in the shaft, which extends up the side of the cam-piston, over the top of the same, as at $n'$ down the opposite side thereof and terminating in a duct $n^2$ in the shaft, as shown.

The operation of the engine is as follows:— When the parts of the engine are in the position, illustrated in Figs. 3 and 9, suppose the cylinder to have assumed the position shown therein. The live steam passes for an instant from the ports $k^3$ and $k^4$, directly behind the valve $l$, whereby the cylinder is caused to rotate in the direction indicated by the arrow $o$. Immediately the spring-actuated valve $l$ travels along the curve of the cam piston $c'$, and said valve $l$ receives the full force of the steam upon its opposite side causing the valve $l'$ to pass over the exhaust port $c^6$ and allowing the steam to escape through said port into the shaft c and out of the opening $c^7$ therein. In a like manner the valve $l'$ is acted upon when the valve $l$ has assumed its position on the exhaust side of the cam piston.

In order to more clearly show up the action of the valves and the expansive use of the steam upon the valve, I have illustrated the inner construction of my engine in the enlarged sectional view in Fig. 9, in which I have marked the four valves, "1," "2," "3," "4." The action of the steam upon them and their manner of operation are of course similar to that described in the machine illustrated in connection with Figs. 3 and 4 of the drawings, the expansive use of the steam confined between two valves being more evident from this arrangement of the valves. From Fig. 9 it will be seen, that when the live steam enters behind the valve marked "1," the previously admitted steam is entrapped in the chamber marked "I," formed by the valves 1 and 2, and during the movement of the engine and the movements of the valves, when valve "2" assumes the place of valve "3," and valve "1" the present position of valve "2," it will be noticed from the drawings that the steam chamber "II" between the valves has increased to nearly twice the size of chamber "I," owing to the arrangement of the curved surface of the stationary piston. Thus it will be evident, that during the change of positions of the valves 1 and 2 to the positions of valves 2 and 3 respectively, the entrapped steam has an opportunity to act expansively in conjunction with the live steam now acting upon valve 1, until valve 3 exhausts, thereby allowing the escape of the steam from chamber "II," and causing the expansive action of the steam in chamber "I" as the size of the chamber increases during the movement of the cylinder of the machine.

The curve of the piston represented in Fig. 9 is the preferred form of curve, as it allows a gradual action of the valves, and during the changes of position of the valves, causes the one chamber formed between two of the valves in which the steam is to act expansively, to be greatly increased in size over the chamber formed by the one valve and the valve just receiving the live steam. Hence it will be seen that the same amount of steam admitted and cut off occupies the greatest amount of space just before the valve reaches the exhaust port.

From the above description and from the drawings herewith accompanying it will be seen that live steam is admitted four times during one revolution of the cylinder, and while upon one valve the live steam acts with its full volume of force, the steam retained between two of the other valves acts expansively until the exhaust port is reached.

Another great advantage is, that no matter in what position the engine is stopped, there will always be one valve in such a position to receive the pressure of live steam on the back thereof, thereby completely avoiding all dead centers and the engine will start as soon as live steam is admitted.

Of course it will be evident, that certain arrangements and combinations of parts of the engine may be changed without departing from the scope of my invention, and the curvature of the cam-shaped piston may be slightly varied to obtain the best working results, as may be deemed necessary.

Some of the many other advantages of this engine are, that owing to its simplicity and compactness, it is of a cheap construction and with a comparatively small engine gives increased speed and power over engines of the same class and size.

My novel form of engine is light and small and can be conveniently secured to the floor, ceiling or side walls. The use of an extra fly-wheel and belt-pulley is also dispensed with, the cylinder of the engine serving this purpose.

Having thus described my invention, what I claim is—

1. In a rotary engine, the combination, with a stationary shaft and piston, having induction and exhaust ports, communicating with induction and exhaust ducts in said shaft, of a revoluble cylinder on said shaft, and pivoted valves in said cylinder, and a spring behind each valve adapted to exert a constant pressure thereon, and a bridge $k$ having a stem $k'$ movably arranged in the induction port of the piston and provided with one or more ports $k^3$, as and for the purposes set forth.

2. The combination of a cam-shaped piston provided with induction and exhaust ports, with a bridge $k$ having a stem $k'$ movably arranged in the induction port of the piston, and provided with one or more ports $k^3$, and valves $l$ and $l'$ pivoted to the cylinder and provided with springs, substantially as and for the purposes set forth.

3. The herein described rotary engine, comprising therein a stationary shaft and piston thereon, having induction and exhaust ports, communicating with induction and exhaust ducts in said shaft, a revoluble cylinder provided with hubs for arranging the same on the shaft, supports or standards $e$ and $e'$, grooves $n$, $n'$, and $n^2$, in the surface of the shaft and piston, forming a continuous groove for lubricating purposes, and pivoted valves in said cylinder engaging with the surface of the piston, all of said parts being arranged substantially as and for the purposes set forth.

4. The herein described rotary engine, comprising therein a stationary shaft and piston thereon, having induction and exhaust ports, communicating with induction and exhaust ducts in said shaft, a revoluble cylinder provided with hubs for arranging the same on the shaft, supports or standards $e$ and $e'$, grooves $n$, $n'$ and $n^2$, in the surface of the shaft and piston, forming a continuous groove for lubricating purposes, packing rings in the sides of said piston, and pivoted valves in said cylinder engaging with the surface of said piston, all of said parts being arranged substantially as and for the purposes set forth.

5. The herein described rotary engine, comprising therein a stationary shaft and piston thereon, having induction and exhaust ports, communicating with induction and exhaust ducts in said shaft, of a revoluble cylinder provided with hubs $a^8$ having cone-shaped openings $a^9$, supports or standards $e$ and $e'$, cone-shaped collars $d$ on said shaft adapted to extend in the cone-shaped openings in said hubs, and said collars being provided with flanges $d'$ which project over said hubs and a recess $g$, for packing, formed by said flanges; nuts $e^5$ and $e^6$ adapted to be screwed upon the shaft and against the outer surfaces of the bearings in said standards, pivoted valves in said cylinder, engaging with the surface of said piston, all of said parts being arranged substantially as and for the purposes set forth.

6. The herein described rotary engine, comprising therein a stationary shaft and piston thereon, having induction and exhaust ports, communicating with induction and exhaust ducts in said shaft, of a revoluble cylinder provided with hubs $a^8$ having cone-shaped openings $a^9$, supports or standards $e$ and $e'$, cone-shaped collars $d$ on said shaft adapted to extend in the cone-shaped openings in said hubs, and said collars being provided with flanges $d'$ which project over said hubs and a recess $g$ for packing, formed by said flanges, nuts $e^5$ and $e^6$ adapted to be screwed upon the shaft, and against the outer surfaces of the bearings in said standards, pivoted valves in said cylinder, and springs secured to the backs of said valves, whereby the valves are forced into constant sliding engagement with the surface of said piston, all of said parts being arranged substantially as and for the purposes set forth.

7. The herein described rotary engine, comprising therein a stationary shaft and piston thereon, having induction and exhaust ports, communicating with induction and exhaust ducts in said shaft, of a revoluble cylinder provided with hubs $a^8$ having cone-shaped openings $a^9$, supports or standards $e$ and $e'$, cone-shaped collars $d$ on said shaft adapted to extend in the cone-shaped openings on said hubs, and said collars being provided with flanges $d'$ which project over said hubs, nuts $e^5$ and $e^6$ adapted to be screwed upon the shaft and against the outer surfaces of the bearings in said standards, grooves $n$, $n'$, and $n^2$, in the surfaces of the shaft and piston, forming a continuous groove for lubricating purposes, and pivoted valves in said cylinder engaging with the surface of said piston, all of the parts being arranged substantially as and for the purposes set forth.

In testimony that I claim the invention set forth above I have hereunto set my hand this 10th day of February, 1892.

HENRY C. HUNT.

Witnesses:
A. L. DAVIS,
J. H. SCHARLING.